United States Patent [19]

Clark et al.

[11] 3,924,681

[45] Dec. 9, 1975

[54] METHOD OF USING OVERBASED CRUDE OIL AS WATERFLOOD ADDITIVE

[75] Inventors: Charles R. Clark; M. Duane Gregory; Burton M. Casad, all of Ponca City, Okla.; Delmar D. Krehbiel, Lubbock, Tex.; Carl D. Kennedy, Ponca City, Okla.

[73] Assignee: Continental Oil Company, Ponca City, Okla.

[22] Filed: Apr. 30, 1973

[21] Appl. No.: 355,635

[52] U.S. Cl............. 166/270; 166/275; 166/305 R; 252/8.55 D
[51] Int. Cl.² ........................................ E21B 43/22
[58] Field of Search............ 166/270, 300, 273–275, 166/305 R; 252/8.55 D, 33

[56] References Cited
UNITED STATES PATENTS

| | | | |
|---|---|---|---|
| 3,302,713 | 2/1967 | Ahearn et al. .................. | 166/275 X |
| 3,387,655 | 6/1968 | Hurd .................................. | 166/270 |
| 3,392,782 | 7/1968 | Ferrell et al. .................... | 166/270 X |
| 3,398,791 | 8/1968 | Hurd .................................. | 166/270 |
| 3,653,437 | 4/1972 | Gale et al. ......................... | 166/275 |
| 3,804,170 | 4/1974 | Krehbiel et al. ................. | 166/275 X |

*Primary Examiner*—Stephen J. Novosad
*Attorney, Agent, or Firm*—F. Lindsey Scott

[57] ABSTRACT

An improved anionic waterflood additive is prepared by sulfonating a crude oil having an API gravity of at least 25 and an aromatic hydrocarbon content of at least 15 percent by weight; neutralizing the sulfonated crude oil with a base component such as an alkali metal hydroxide, ammonium hydroxide, or an alkali metal carbonate; and overbasing the sulfonate by admixing with an excess of base component such that the ratio: "weight of excess base component/weight of sulfonate" is about 0.03 to about 3.0. The anionic waterflood additive is injected into a petroliferous formation, the formation is waterflooded and oil is recovered.

8 Claims, No Drawings

METHOD OF USING OVERBASED CRUDE OIL AS WATERFLOOD ADDITIVE

BACKGROUND OF THE INVENTION

1. Field of the Invention

In one aspect this invention is related to an anionic waterflood additive.

In another aspect this invention relates to a process for the recovery of hydrocarbons from a petroliferous formation involving injecting into the petroliferous formation as improved anionic waterflood additive plus water.

2. Brief Description of the Prior Art

A large percentage of the oil in petroliferous formations is held within the rock of the formation by the surface forces between the formation rock, the oil therein, and the aqueous liquid in the formation. As a result, a substantial portion of such oil usually remains in the rock of the formation even when wells traversing the formation are no longer productive. Various secondary techniques, such as thermal recovery, gas injection, and waterflooding, have been suggested for the recovery of this fixed oil which remains in the formation after primary recovery methods are no longer feasible to produce additional oil. As a secondary recovery technique, water-flooding is quite commonly employed, and a multiplicity of methods have been suggested for improving the efficiency and economy of oil recovery by the practice of waterflooding. Such methods frequently include incorporation of a water-soluble surfactant in the waterflood liquid, which is injected into the petroliferous formation. A number of typical surfactants have been proposed for this purpose, including alkyl pyridinium salts, sodium lauryl sulfate, certain sulfonates, glycosides, sodium oleates, quaternary ammonium salts, and the like. The use of such surfactants has arisen because it is widely recognized that a low interfacial tension between the sulfonate floodwater and the reservoir crude oil is beneficial to the improvement of recovery efficiencies and feasibilities.

Recently, it has been propsed that nonionic surfactant solutions, such as polyoxyethylene-polyoxypropylene copolymer containg solution be injected through the formation through a first of a series of two well bores to thereby displace the hydrocarbons in the formation toward a second well bore. The nonionic surfactant flood is then followed by an injection of a slug of aqueous caustic mixture into the formation through the first well bore to displace the hydrocarbon of the formation and the injected surfactant toward the second well bore. The caustic slug has a basicity of at least 1.5 pH levels greater than that of the native formation waters. However, the use of a nonionic surfactant has not fully met the needs of the industry for a desirable waterflood surfactant composition, and new compositions are constantly being sought which will allow recovery of the residual oil remaining in the formation following primary oil recovery operations. Also, the surfactant materials of the prior art have on occasion suffered from lack of availability or from non-feasibility due to excessive costs and thus have not entirely satisfied the long-felt need of the industry for a feasible method to recover oil remaining in subterranean petroliferous formations.

OBJECTS OF THE INVENTION

An object of the invention is to provide an improved waterflood additive and method of using the waterflood additive in the recovery of secondary hydrocarbons from petroliferous formations.

These and other objects, advantages, and features of this invention will become apparent to those skilled in the art from a reading of the following detailed description and claims.

SUMMARY OF THE INVENTION

According to the present invention, we have now found an improved anionic waterflood additive which comprises an overbased sulfonate derived from a crude oil having an API gravity of at least 25 and an aromatic content of at least 15 percent by weight.

Further, according to the invention, we have found that injection of the improved anionic waterflood additive plus water into a petroliferous formation results in recovery of substantial yields of hydrocarbons therefrom.

One method of employing waterflood additive of the instant invention include the first step of injecting a slug of an aqueous mixture containing about 0.5 to about 25 weight percent of the overbased sulfonate into the formation through an injection well and then recovering displaced hydrocarbons from the formation through a production well. Additional hydrocarbons can be recovered, if desired, by injecting an effective amount of an aqueous slug of base component into the petroliferous formation after the over-based sulfonate slug has been injected.

Another method of recovering the hydrocarbons from a petroliferous formation involves injecting a first slug of an aqueous mixture containing about 0.5 to about 25 weight percent of the sulfonate derived from the alkylate product into the petroliferous formation followed by an amount of an aqueous base component containing mixtures sufficient to overbase the sulfonate such that the over-based sulfonate is formed in situ by contacting of the aqueous sulfonate containing slug and the aqueous base component containing slug.

DESCRIPTION OF THE PREFERRED EMBODIMENTS

The instant invention relates to an improved anionic waterflood additive. The anionic waterflood additive is prepared by sulfonating a crude oil having an API gravity of at least 25 and an aromatic hydrocarbon content of at least 15 percent by weight, neutralizing the sulfonated crude oil with a base component such as an alkali metal hydroxide, ammonium hydroxide, or an alkali metal carbonate; and overbasing the sulfonate by admixing with an excess of base component such that the ratio: "weight of excess base component/weight of sulfonate" is about 0.03 to about 3.0.

The instant invention also relates to injecting the improved anionic waterflood additive with water into a petroliferous formation to promote the recovery of oil from the formation.

The crude oil which is employed according to the instant invention can be any crude oil having an API gravity of at least 25 and an aromatic hydrocarbon content of at least 15 percent by weight. The API gravity test is well-known to those skilled in the art, it has ASTM No. D-287. Aromatics content is determinted by ASTM D-1219 (FIA Method) or ASTM Appendix III (1960) (PONA Method). Medium heavy, intermediate, or mixed base crude oils having an API gravity of about 27 to about 32 and an aromatic hydrocarbon content of about 15 to about 25 percent by weight are particularly suitable. One of such oils which is now presently particularly preferred is the oil produced from the Tensleep Sandstone formation of the Sussex Oil Field in Johnson County, Wyoming.

The sulfonation conversion of the crude oil to the sulfonic acid derivative thereof can be by any procedure heretofore known to the art for the sulfonation of a sulfonatable hydrocarbon. A number of sulfonation procedures are well-known in the art wherein $SO_3$, sulfuric acid or oleum, mixtures of $SO_3$ and $SO_2$, or organic sulfonating agents containing $SO_3$ are employed as a sulfonating agent. Furthermore, sulfonation can be carried out in either a batch-type process or a continuous falling film reaction process. When $SO_3$ is employed as a sulfonating agent, the mole ratio of $SO_3$ to the aromatic hydrocarbon content of the crude oil is suitable about 1:1 to about 2.0:1. Thus, each aromatic hydrocarbon molecule of the crude oil should have, on the average, about one or more sulfonic acid groups thereon following the sulfonation reaction.

The sulfonic acids formed by the sulfonation reaction are then converted to the respective sulfonates by reacting with a base component. The conversion to the sulfonates is readily effected by simply admixing the base component with the sulfonic acids in the sulfonated crude oil mixture. This can be accomplished by any means known to the art for conversion of sulfonic acids to sulfonates. Such procedures are well-known to those skilled in the art.

The base component employed in this invention is selected from the alkali metal hydroxides, ammonium hydroxides, and the alkali metal carbonates. Examples of such base components include NaOH, KOH, LiOH, $Na_2CO_3$, $NaHCO_3$, $NH_4OH$, $K_2CO_3$, and the like. Sodium hydroxide is presently particularly preferred as a base component. The overbased sulfonates have excess base component added beyond that needed to neutralize the sulfonic acid precursors to the sulonates such that the ratio: "weight of excess base component/weight of sulfonate" is about 0.03 to about 3.0. Overbased sulfonates wherein the ratio is about 0.20 to about 1.0 are presently particularly preferred.

Thus, when the sulfonates of the sulfonated crude oil are merely neutralized and injected as an aqueous mixture of the neutralized product into the petroliferous formation, a sufficient amount of the aqueous base component must be added in the second slug to insure that the waterflood additive compositions formed in situ in the formation are overbased in the prescribed ranges.

In describing the use of the anionic waterflood additives of the instant invention, two methods of injecting the additives into a petroliferous formation will be discussed. However, it should be understood that neither method is presently particularly preferred over the other and the particular method which is chosen for a particular application will depend to a large extent upon the facilities available at the well site.

One method of employing the anionic waterflood additives of the instant invention involves injecting an aqueous slug containing about 0.5 to about 25 weight percent of the sulfonated crude oil through a well bore into a petroliferous subterranean formation from which additional hydrocarbon is to be recovered. After the sulfonate slug has been dispersed into the formation, an effective amount of an aqueous base component mixture in the form of a second slug is introduced into the formation to form an aqueous mixture in situ in the subterranean formation containing about 0.5 to about 25 weight percent of the overbased waterflood additive composition. When employing such a method, a sufficient amount of the base component containing mixture must be injected into the formation to assure that the waterflood additive will be overbased such that the "ratio" is about 0.03 to about 3.0. If sufficient base component is not added to reach the lower minimum ratio of about 0.03, desirable results are not obtained. Likewise, problems of viscosity and handling of materials are encountered when the amount of overbasing is above the upper ratio value of about 3.0.

The second system which can be employed in employing the anionic waterflood additive compositions involves producing the overbased sulfonate, admixing with water, and injecting an aqueous mixture containing from about 0.5 to about 25 weight percent of the overbased crude oil sulfonate directly into the petroliferous formation as one slug. When employing this procedure, the same limitations as to the overbasing ratio apply as to the procedure as heretofore described.

While the overbased sulfonates demonstrate remarkable properties as waterflood additives in the second system described, additional tertiary oil can be recovered from the subterranean petroliferous formation by injecting an effective amount of an aqueous mixture containing a base component into the formation which has previously been contacted with the overbased sulfonate composition. The amount and concentration of the aqueous base component containing mixture employed can vary widely. However, desirable results are obtained when the concentration of base component in the mixture is about 0.5 to about 50 percent by weight, and the amount of mixture injected into the formation is about 10 to 1000 volume percent based on the amount of sulfonate containing slug injected into the formation.

As heretofore stated, the material injected into the petroliferous formation is an aqueous mixture containing about 0.5 to about 25 weight percent of the overbased crude oil sulfonate waterflood additive. Particularly desirable results are obtained when the aqueous mixture injected into the formation contains about one to about 15 weight percent of the overbased crude oil sulfonate.

Difficulties are sometimes encountered in the formation of the aqueous mixtures due to the solubility characteristics of the anionic waterflood composition. When such solubility problems are detected, one can add an effective amount of any suitable water-soluble solubilizing agent to promote solubility. The amount of water-soluble solubilizing agent required in such instances will vary widely, but will generally be within the range of 0.5 to about 25 weight percent based on the weight of the total composition. Examples of some suitable water-soluble solubilizing agents include lower alcohols such as methanol, ethanol, 2-propanol, and the like; aryl sulfonates, such as sodium benzene sulfonate, sodium xylene sulfonates, sodium toluene sulfonates, sodium hexylbenzene sulfonates, sodium octylbenzene sulfonates, and the like; alcohol ethoxylates wherein the molecule contains about 30 to about 90 weight percent of ethylene oxide and the alcohol constituent contains about 2 to about 20 carbon atoms;

lower olefin-derived sulfonates derived from alkenes such as butenes and pentenes and the like; and ethoxylated alkylphenols such as octylphenol.

It is to be understood that any sulfonates added as such water-soluble solubilizing agents are not to be taken into account in determining the ratio: "weight of excess base component/weight of sulfonate".

In order to more fully explain the present invention, the following examples are provided. However, it is to be understood that the examples are not intended to function as a limitation on the invention as described and claimed in the application.

EXAMPLE I

A quantity of crude oil produced from the Tensleep Sandstone formation of the Sussex Oil Field in Johnson County, Wyoming was obtained. This crude oil had an API gravity of about 30 and an aromatic hydrocaron content of about 20. The aromatics in the crude oil were identified to include benzene, toluene, xylenes, trimethylbenzenes, ethyl toluenes, isopropylbenzene, n-propylbenzene, diethylbenzenes, methylisopropylbenzenes, 1,2,4,5-tetramethylbenzene, secondary butylbenzene, tertiary butylbenzene, isobutylbenzene, triethylbenzene, indenes and a quantity of other unidentified heavier aromatic hydrocarbons. The crude oil was classified as a medium-heavy intermediate or mixed base crude.

The Sussex Tensleep crude oil was batch sulfonated with $SO_3$ in a stirred reactor at 75°C with 120 g of $SO_3$ being employed for 300 g of the crude oil. The resulting sulfonic acids were neutralized with 15 weight percent aqueous sodium hydroxide solution to yield the corresponding sulfonates.

The sulfonated crude oil mixture thus prepared was diluted with water and placed in an oven at 160°F for about 16 hours and the excess oil removed as an upper layer to yield a sulfonated crude oil product having 8.9 percent by weight of hydrocarbon sulfonate therein.

A run was then conducted to evaluate the oil recovery properties of the anionic waterflood additive comprising the overbased crude oil sulfonate. In the run, a 12 × 2 × 2 inch Berea sandstone core was evacuated under vacuum and then saturated with 5 weight percent sodium chloride brine. The brine saturated core was reduced to irreducible water saturation with Blandol product (a highly refined mineral oil) and then waterflooded to residual oil saturation with the sodium chloride brine solution.

The sulfonated crude oil waterflood additive having 8.6 weight percent active sulfonate therein plus 4 weight percent excess sodium hydroxide in aqueous solution was injected into the core as a slug. A 3.5 percent PV slug of this aqueous solution was used for the test. Tertiary waterflood was then conducted at 40 cc of water/hour, of flow rate equivalent to 6–7 feet per day of reservoir flooding to determine the effectiveness of the overbased waterflood additive as an oil recovery agent. The run was conducted at about 130°F. The ratio (rate of excess base component/weight of sulfonate) was 0.46. The S value representing the volume of oil produced as a percent of pore volume was 6.1.

This example demonstrates use of an overbased crude oil sulfonate of the instant invention to promote oil recovery.

We claim:
1. a process for recovering hydrocarbons from a petroliferous formation which consists essentially of:
   d. injecting into the formation an effective amount of an aqueous mixture which contains about 0.5 to about 25 weight percent of an overbased waterflood additive; the water-flood additive comprising a base component plus a sulfonated virgin crude oil; wherein the waterflood additive is sufficiently overbased that the ratio: "weight of excess base component/weight of sulfonate" is about 0.03 to about 3.0; wherein the base component is sodium hydroxide; wherein the sulfonated virgin crude oil is derived from a crude oil having an API gravity of at least 25 and an aromatic hydrocarbon content of at least 15 percent by weight; and
   e. recovering the displaced hydrocarbons from the formation.
2. The process of claim 1 which includes the steps of forming the overbased waterflood additive in situ in the petroliferous formation by the sequential steps of:
   f. injecting into the formation an effective amount of an aqueous mixture containing about 0.5 to about 25 weight percent of the sulfonated virgin crude oil component of the waterflood additive; and
   g. injecting into the formation an aqueous mixture containing a sufficient amount of sodium hydroxide such that the ratio of the total materials injected is about 0.03 to about 3.0.
3. The process of claim 1 which includes the steps of forming the overbased anionic waterflood additive in situ in the petroliferous formation by the sequential steps of:
   h. injecting into the formation an effective amount of an aqueous mixture containing about 0.5 to about 25 weight percent of the sulfonated virgin crude oil; and
   i. injecting into the formation an aqueous mixture containing a sufficient amount of sodium hydroxide such that the ratio of the total materials injected is about 0.03 to about 3.0.
4. The process of claim 3 wherein the sulfonated virgin crude oil is derived from a medium heavy, intermediate or mixed based crude oil
5. The process of claim 1 wherein the base component is NaOH and wherein the sulfonated virgin crude oil is derived from a medium heavy, intermediate or mixed base crude oil.
6. The process of claim 5 wherein the sulfonated crude oil is derived from the Tensleep Sandstone formation of the Sussex Oil Field in Johnson County, Wyoming.
7. The process of claim 1 which includes the step of injecting into the formation subsequent to the waterflood additive, an additional amount of about 10 to about 1000 volume percent, based on the amount of the aqueous mixture (containing the sulfonated virgin crude oil plus sodium hydroxide) of additional aqueous mixture of sodium hydroxide, such additional sodium hydroxide containing about 0.5 to about 50 weight percent sodium hydroxide.
8. The process of claim 7 wherein the sulfonated virgin crude oil is derived from a medium heavy, intermediate or mixed base crude oil.

* * * * *